Figure 1:
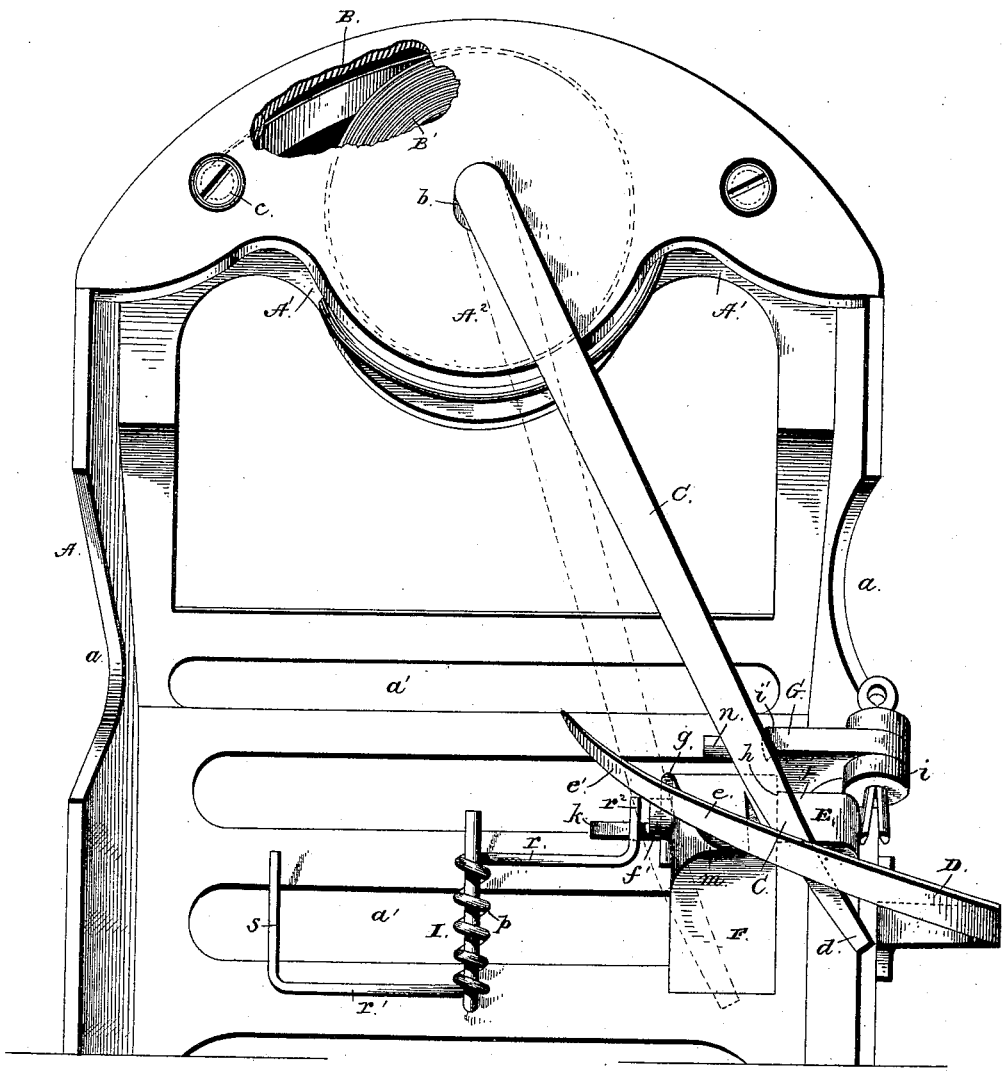

(No Model.) 2 Sheets—Sheet 1.

O. HUFFMAN.
ANIMAL TRAP.

No. 395,054. Patented Dec. 25, 1888.

Witnesses:
Jas. E. Hutchinson
G. F. Downing

Inventor:
Orlando Huffman
By Liggett & Liggett
Atty.

(No Model.) 2 Sheets—Sheet 2.
O. HUFFMAN.
ANIMAL TRAP.
No. 395,054. Patented Dec. 25, 1888.
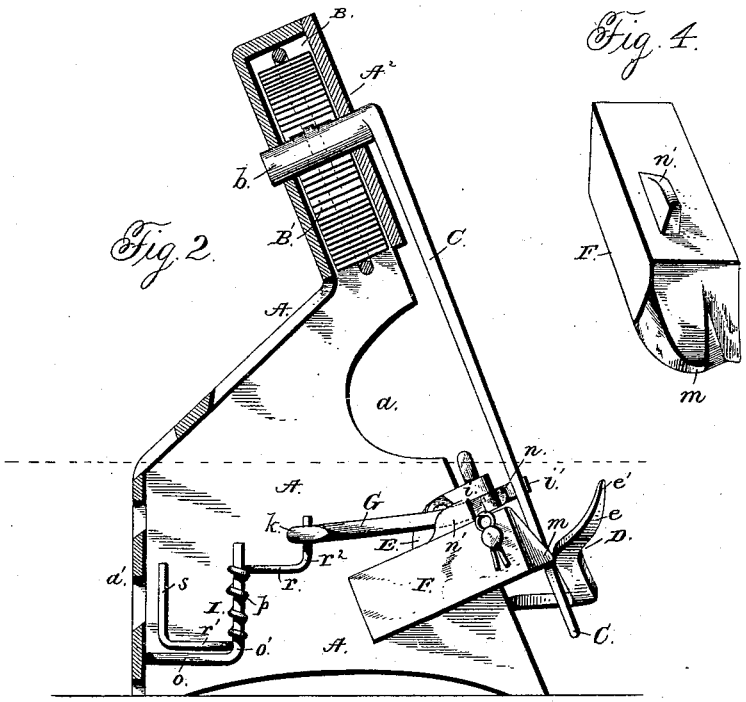
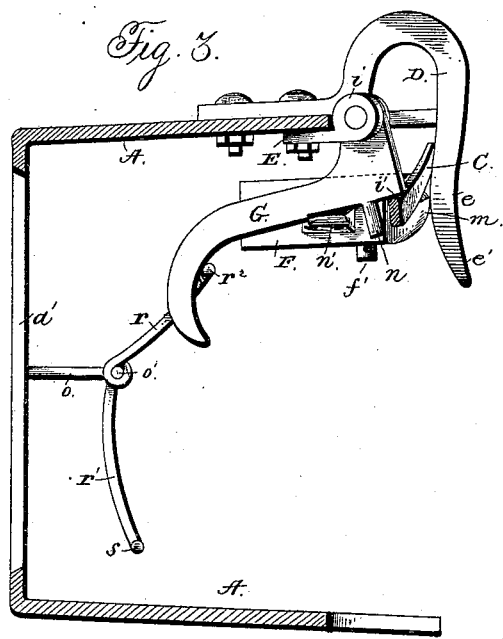
Witnesses:
Jas. E. Hutchinson.
G. F. Downing.
Inventor
Orlando Huffman.
by Leggett & Leggett.
attys.

UNITED STATES PATENT OFFICE.

ORLANDO HUFFMAN, OF FRIEND, NEBRASKA, ASSIGNOR OF ONE-HALF TO THOMAS E. BROWNE, OF SAME PLACE.

ANIMAL-TRAP.

SPECIFICATION forming part of Letters Patent No. 395,054, dated December 25, 1888.

Application filed July 7, 1888. Serial No. 279,316. (No model.)

*To all whom it may concern:*

Be it known that I, ORLANDO HUFFMAN, of Friend, in the county of Saline and State of Nebraska, have invented certain new and useful Improvements in Animal-Traps; and I do hereby declare the following to be a full, clear, and exact description of the invention, such as will enable others skilled in the art to which it appertains to make and use the same.

My invention relates to an improvement in animal-traps of a class that kill the rodent, throw it away from the trap, and reset for successive operations.

The object of this invention is to provide an animal-trap of the type mentioned which will be of simple, cheap, and durable construction, and that is capable of rapid production from metal, principally cast-iron.

A further object is to additionally improve the form and operative mechanism of the animal-trap of my invention that is exhibited in Patent No. 380,439, dated April 3, 1888, embodying some of the mechanical details of said trap in modified form and adding an essential element which renders my present invention more practical and reliable in operation as a resetting-trap.

Referring to the drawings making a part of this specification, Figure 1 is a front elevation of the trap in perspective, showing the trap set to kill animals. Fig. 2 is a side elevation in section of the device, showing the position assumed by the mechanism when the trap has been sprung and reset. Fig. 3 is a plan view of the trap, taken on the line $x\ x$ of Fig. 1. Fig. 4 is a view in perspective of one of the details.

A is the frame of the trap, made, preferably, of cast-iron and given a cage form, open on the front, with the side $a$ nearest the bait notched out to permit a rat or vermin to approach the bait on this side of the trap.

The rear side, $a'$, of the frame A is made with open slat-work, or in any preferred form that will lighten it and at the same time prevent a rat, gopher, or other rodent from having access to the bait on this side of the trap.

The top of the frame A is recessed at $A'$ to form a spring-box, B, and a cap-plate, $A^2$, is fitted to the front face of the same. Within the box B a coiled spring, $B'$, is located, the inner end of which is secured to a journaled shaft, $b$, which is loosely supported to revolve in bearings formed in the case and cap-plate. The outer end of the spring $B'$ is secured to a transverse rod, $c$, which extends across the spring-box, and, in fact, is the body of one of the screws which secure the cap-plate $A^2$ in position. On the front end of the shaft $b$ a metal bar, C, is secured at a right angle thereto, having clearance to permit it to revolve, and of such a relative length that it will not strike the ground or other base on which the trap may be set.

The free end $d$ of the bar C is preferably bent slightly edgewise and flattened to give it a saber form with a thinned edge. This bar is designed to kill the rat or other vermin by a forcible impact with its body when revolved rapidly by a release of the powerful spring $B'$, which is manifestly adapted to give it such a revoluble movement if wound up, held in such a condition, and then suddenly released.

In order to hold the bar C in position to retain the spring $B'$ wound up and permit a ready release by action of trigger mechanism that will be described in its order, there is a simple "setting" device provided, which consists of several pieces that act together to accomplish the desired result, as will now be explained.

On the right side of the frame A a guard-piece, D, is secured, which is bent into hook form, so as to extend its free end $e$ in front of the trap-frame, the extremity $e'$ being bent outwardly and upwardly, forming an inclined edge, $e^2$, next to the front edges of the frame to which it is adjacent.

A bracket-plate, E, is adjustably secured to the inner surface of the right side of the frame A, one limb, $f$, of said bracket-plate extending inwardly from the support for the gravity-block F, that is perforated to be loosely mounted and secured in place on the rounded shank $f'$ of the limb $f$ by a cross-key, $g$, that is inserted in a perforation made for it through the body of said shank, the reduction of the limb $f$ to form the shank producing a shoulder or offset at $h$, against which the gravity-block F loosely abuts when in secured position on its support.

The bracket-plate E is furnished with a slotted ear, $i$, to which is hinged one end of the catch-bar G, this bar being bent to extend rearwardly, its free end $k$ curving to project toward the center of the trap. The corner $i'$, formed on the catch-bar G where it is bent at a right angle to project rearwardly, as just stated, is in such a relative position that it will afford an abutment, against which the edge of the revolving bar C rests when the trap is "set." The rounded surface of the bar where it engages the corner $i'$ and the slight incline given to the latter renders the adjustment sensitive and the bar easy to disengage if the catch-bar G is moved slightly to carry its free end $k$ toward the side wall of the frame A.

A sloping surface is formed on the projecting front end of the gravity-block F to reduce it. The side surfaces of this end of the block are cut away on inclines toward each other to form a nose, $m$, which is of such a relative length as to cause it to impinge with its outer point against the adjacent edge of the guard-piece D, which will hold the latter in such a position that a projecting rounded finger, $n$, formed on the catch-bar G, will engage a lug, $n'$, that projects from the top surface of the gravity-block F. The engagement of parts named occurs when the block F is raised by the forcible contact of the revolving bar C, that is guided by the curved outer edge of the guard-piece D, and the adjoining sloped corner of the block F, against which it strikes when actuated by the coiled spring B', the lifting of the block thus produced allowing the bar C to engage the corner $i'$, that has been thrown out into position for such an engagement by the elevation of the block and the contact of the lug $n'$ with the finger $n$, as previously stated.

On the rear wall of the frame A an arm, $o$, is projected horizontally toward the front of the trap, and at $o'$ bent up at a right angle to the horizontal portion, thus producing a support for the bait-carrier I, which is also a trigger to set free the locked edge of the bar C.

The trigger I is preferably made of wire bent into a coil at $p$, the coil being of sufficient length to form a box that loosely embraces the upright portion of the arm $o$, two limbs, $r$ $r'$, extending from the coil $p$ at an angle to each other, but in parallel horizontal planes. The upper limb, $r$, is bent up at its outer end, $r^2$, to adapt it to abut against the hook end of the catch-bar G. The other limb, $r'$, extends toward the left side of the frame A, and is also turned up, producing a vertical pin, $s$, on which the bait is attached securely.

When the trap is to be set for use, the bar C is revolved toward the catch-bar G, the gravity-block rocking to allow the end of the bar to pass it. When a sufficient number of revolutions have been given to the bar to wind up the spring B', the edge of the bar is made to rest onto the shoulder or corner $i'$ of the catch-bar G, which will hold the free end of this latch-bar against the portion $r^2$ of the trigger-limb $r$, the other limb being extended with the bait held on it well to the rear of the trap-frame A. If the bait is pulled forwardly by a depredating rodent, the lever C will be instantly set free, and by the action of the spring B' it will swing forcibly against the side or backbone of the animal, the shock being of sufficient violence to kill the vermin outright, or so disable it as to prevent its escape. If the bar strikes the rat or gopher on the side, as it is most likely to do, it will throw the animal away from the device, and by a continuation of revoluble movement the bar will strike against the sloping wall of the gravity-block F, which will check the bar, while it yields to its impact, thus throwing the catch-bar into position to have its corner $i'$ cross the path of the bar C and arrest it, effecting a resetting of the trap in an obvious manner.

The provision of the gravity-block F is one of the essential features of my present invention, as it is effective in the absorption of shock caused by the bar C if the trap is discharged without hitting an animal, so that the bar will be checked and eased into contact with the corner $i'$ of the catch-bar G.

Having fully described my invention, what I claim as new, and desire to secure by Letters Patent, is—

1. In an animal-trap, the combination, with a frame and a spring-actuated bar supported to revolve on said frame, of a latch-bar hinged to the frame and provided with a shoulder for engaging the spring-actuated bar, a trigger connected to the latch-bar for moving the latter away from the spring-actuated bar, and a gravity-block adapted to receive the impact of the spring-actuated bar, substantially as set forth.

2. In an animal-trap, the combination, with a frame having two sides, a protecting rear wall, and a spring-box mounted between the side walls, of a coiled spring, a shaft, a revolving bar secured to the shaft, a guard-piece, a pivoted catch-bar, a pivoted gravity-block that is adapted to receive the impact of the revolving bar, and a rocking trigger that engages the catch-bar, substantially as set forth.

3. In an animal-trap, the combination, with a frame, a spring-box mounted between the upright side walls of the frame, a coiled spring, a shaft on which this spring is wound and supported in the spring-box, and a revolving hammer-bar, of a guard-piece that is curved on its edge, a pivoted gravity-block the nose of which engages the adjacent edge of the guard-piece, a pivoted latch-bar having its free end adapted to engage the trigger-limb, which carries a bait, and a trigger supported to rock in a horizontal plane and discharge the hammer-bar when the bait is tampered with, substantially as set forth.

In testimony whereof I have signed this specification in the presence of two subscribing witnesses.

O. HUFFMAN.

Witnesses:
 E. D. LEONARD,
 L. R. LEONARD.